United States Patent
Grätz

(10) Patent No.: US 8,491,427 B2
(45) Date of Patent: Jul. 23, 2013

(54) DERAILLEUR HANGER WITH INSERTION AID

(75) Inventor: Michael Grätz, Wiggensbach (DE)

(73) Assignee: Jochen Klieber, Tacherting (DE)

( * ) Notice: Subject to any disclaimer, the term of this patent is extended or adjusted under 35 U.S.C. 154(b) by 514 days.

(21) Appl. No.: 12/598,907

(22) PCT Filed: Apr. 30, 2008

(86) PCT No.: PCT/EP2008/055389
§ 371 (c)(1),
(2), (4) Date: Jan. 29, 2010

(87) PCT Pub. No.: WO2008/135518
PCT Pub. Date: Nov. 13, 2008

(65) Prior Publication Data
US 2010/0137082 A1    Jun. 3, 2010

(30) Foreign Application Priority Data

May 5, 2007  (DE) .................... 20 2007 006 451 U

(51) Int. Cl.
*F16H 9/00* (2006.01)
*B62J 9/00* (2006.01)

(52) U.S. Cl.
USPC ....................................... 474/78; 280/288.4

(58) Field of Classification Search
USPC ........... 474/78–83, 144; 280/288, 284, 281.1, 280/261, 283, 260, 238, 288.4
See application file for complete search history.

(56) References Cited

U.S. PATENT DOCUMENTS

| 570,327 | A | * | 10/1896 | Naregang | 474/116 |
| 4,632,415 | A | | 12/1986 | San Hai | |
| 5,020,819 | A | * | 6/1991 | D'Aluisio et al. | 280/288 |
| 5,082,303 | A | * | 1/1992 | Duehring et al. | 280/288 |
| 5,096,215 | A | * | 3/1992 | Chonan | 280/284 |
| 5,397,273 | A | * | 3/1995 | Ando | 474/82 |
| 5,421,786 | A | * | 6/1995 | Ando | 474/78 |
| 5,492,211 | A | | 2/1996 | Wu | |

(Continued)

FOREIGN PATENT DOCUMENTS

| CA | 2114960 | 8/2000 |
| CH | 272136 | 3/1951 |

(Continued)

OTHER PUBLICATIONS

International Search Report, Dated Aug. 6, 2008, Corresponding to PCT/EP2008/055389.

*Primary Examiner* — William E Dondero
*Assistant Examiner* — Minh Truong
(74) *Attorney, Agent, or Firm* — Christie, Parker & Hale, LLP

(57) ABSTRACT

The invention relates to a derailleur hanger for a bicycle having an insertion aid for inserting the wheel hub between the dropouts of a fork or frame. A derailleur hanger (10) for a bicycle according to the invention having, on a first dropout (1) and/or on a second dropout (2), first and second recesses (3, 4), respectively, for receiving the corresponding ends (31, 32) of a wheel hub (30) is characterized in that the derailleur hanger (10) is configured such that the shape of a lateral surface (5) of the recess (4) is substantially steadily continued by a first guide surface (12) of the derailleur hanger (10).

8 Claims, 3 Drawing Sheets

U.S. PATENT DOCUMENTS

| | | | |
|---|---|---|---|
| 5,997,104 | A | 12/1999 | Campagnolo |
| 6,089,675 | A | 7/2000 | Schlanger |
| 6,264,285 | B1 | 7/2001 | Yu |
| 6,412,803 | B1 | 7/2002 | Kalikyan et al. |
| 6,837,815 | B2 * | 1/2005 | Meggiolan ............... 474/82 |
| 6,886,894 | B2 | 5/2005 | Kanehisa et al. |
| 7,207,914 | B2 * | 4/2007 | Chamberlain et al. ........ 474/144 |
| 7,494,145 | B2 | 2/2009 | Schroeder et al. |
| 7,614,972 | B2 * | 11/2009 | Oseto .......................... 474/82 |
| 7,722,487 | B2 * | 5/2010 | Ichida et al. ................ 474/80 |
| 7,905,804 | B2 * | 3/2011 | Yamaguchi et al. ........... 474/80 |
| 8,075,010 | B2 * | 12/2011 | Talavasek et al. ............ 280/288 |
| 2003/0171175 | A1 * | 9/2003 | Shahana et al. .............. 474/80 |
| 2008/0197600 | A1 | 8/2008 | Watarai |

FOREIGN PATENT DOCUMENTS

| | | |
|---|---|---|
| DE | 90 18 008 U1 | 10/1993 |
| DE | 90 18 008.9 | 11/1993 |
| DE | 90 18 008 U1 | 11/1993 |
| DE | 20 2006 003 055 U1 | 9/2006 |
| DE | 20 2006 003055 U1 | 9/2006 |
| DE | 20 2006 003055 U1 | 11/2006 |
| EP | 0 421 257 A1 | 4/1991 |
| EP | 0 284 535 B1 | 4/1992 |
| EP | 0 284 535 A1 | 9/1998 |
| EP | 1 452 435 A2 | 9/2004 |
| WO | WO 2005/051753 A1 | 6/2005 |

* cited by examiner

DERAILLEUR HANGER WITH INSERTION AID

CROSS-REFERENCE TO RELATED APPLICATION

This application is a National Phase Patent Application and claims the priority of International Application Number PCT/EP2008/055389, filed on Apr. 30, 2008, which claims priority of German Patent Application Number 20 2007 006 451.9, filed on May 5, 2007.

The present invention relates to a derailleur hanger for a bicycle. In particular, the present invention relates to a bicycle derailleur hanger having an insertion aid for inserting the wheel hub between the dropouts of a fork or frame.

When through-axle systems are used for mounting wheels, in the assembled state, both sides of the wheel hub with the through-axle extending through it are received in downwardly open, U-shaped recesses provided at the dropouts. In this way the wheel hub is easily placed in the position required for assembly. To ensure that the wheel hub fits with as little play as possible, the distance between the dropouts is adapted to match the length of the wheel hub, with only a slightly greater distance provided between the dropouts to ensure that the wheel hub fits with as little play as possible.

When inserting the wheel into the fork or frame, this often results in the problem that the wheel hub may be tilted between the dropouts, which makes mounting the wheel more difficult. Moreover, under usual circumstances, the rear wheel of a bicycle is inserted against the pull of the chain tensioning device on the derailleur, because the chain has to be put over the cogset before both ends of the wheel hub are pushed into the recesses of the dropouts intended for this purpose. This sometimes makes mounting a wheel substantially more difficult, especially if the wheel is mounted using a through-axle system.

Therefore, it is an object of the present invention to provide a device which overcomes the disadvantages of the prior art and which in particular permits, by simple means, placing a wheel into the position intended for mounting it—against the pull of the chain tensioning device, if necessary—and preferably to provide a solution that is easy to manufacture and has reduced weight.

This and other objects are achieved by a derailleur hanger for a bicycle according to various embodiments of the subject invention.

Accordingly, a derailleur hanger for a bicycle having first and second recesses, respectively, on a first dropout and/or a second dropout, for receiving the corresponding ends of a wheel hub, includes a first guide surface which is a substantially steady continuation of the side surface, i.e. the lateral limiting surface of the corresponding recess.

In this way, when mounting the wheel, the derailleur hanger of the present invention permits moving the respective end of the wheel hub along the first guide surface of the derailleur hanger so that the wheel hub automatically advances to its mounting position within the recesses of the two dropouts. By arranging a suitably designed first guide surface on the derailleur hanger, a solution is provided that is easy to manufacture and, in particular, has reduced weight.

In a particularly preferred embodiment of the present invention, the first and/or second recess additionally includes a lateral support surface against which, in the assembled state, the corresponding end of the wheel hub is supported because the two dropouts are braced against each other. In this case, the derailleur hanger is preferably configured such that the shape of the support surface of the recess of the dropout is substantially steadily continued along a second guide surface of the derailleur hanger.

In this way, when the wheel hub is positioned against the first and second guide surfaces of the derailleur hanger, the hub is guided so as to successfully avoid wedging of the hub and/or shifting due to the tensional forces from the chain tensioning device, for example, that act on one side of the hub. In that context, the first and second guide surfaces limit the path of the hub in two spatial directions so that even in difficult conditions it can be safely and quickly positioned in the recesses of the dropouts intended for this purpose.

Preferably the derailleur hanger of the present invention has a first hole for receiving a first fastening bolt for a derailleur, the first hole extending substantially in parallel with the central axis of the wheel hub.

In a particularly preferred embodiment of the present invention, the derailleur hanger is configured as a part separate from the dropout, which part is fixed to the dropout by at least a second fastening bolt in the assembled state. By releasing the fastening bolt, the derailleur hanger can be replaced with a similar derailleur hanger, e.g. if it has been damaged.

Particularly preferably, the second fastening bolt extends substantially perpendicular to a central axis of the hub about which the hub may rotate, in which case the second fastening bolt may also be used for fastening or bracing other parts to the dropout if necessary. Preferably the derailleur hanger has a threaded hole which the second fastening bolt can directly be screwed into, whereby the derailleur hanger can be securely attached to the corresponding dropout.

To further improve attachment of the derailleur hanger to the dropout, and particularly preferred to avoid rotation of the derailleur hanger about the axis of the second fastening bolt, both during mounting and while the bicycle is in use, there is provided on the derailleur hanger an anti-rotation element in the form of a pin which engages with a corresponding hole located on the dropout.

Other features of the present invention are apparent from the following detailed description in combination with the claims and the figures, in which FIG. 1 shows a wheel hub mounted between two dropouts;

In the following description of the figures, the same reference numerals refer to the same elements, or elements that have similar functions, in different figures.

Figure 1:
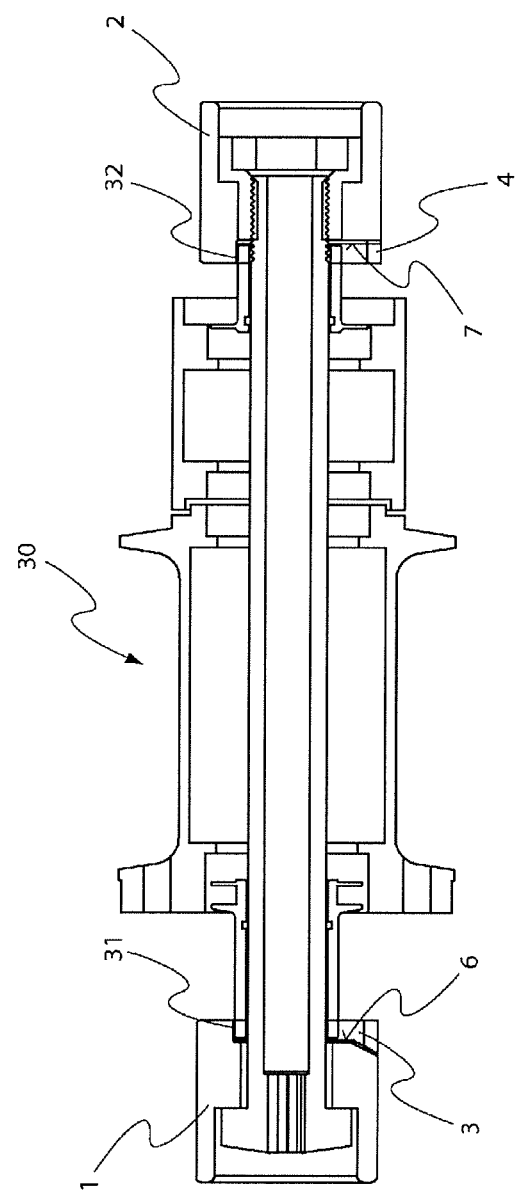

FIG. 1 shows a wheel hub mounted using a through-axle system for attachment of the wheel, as is also known from the prior art. The first end 31 of the wheel hub 30 is received in a first recess 3 of the first dropout 1, and its second end 32 opposite the first end is received in a second recess 4 of the second dropout 2.

By screwing in and tightening the through axle as shown in FIG. 1, the dropouts 1, 2 are slightly pulled together, so that the wheel hub 30 positioned between the dropouts is braced between the support surfaces 6 and 7.

Figure 2:
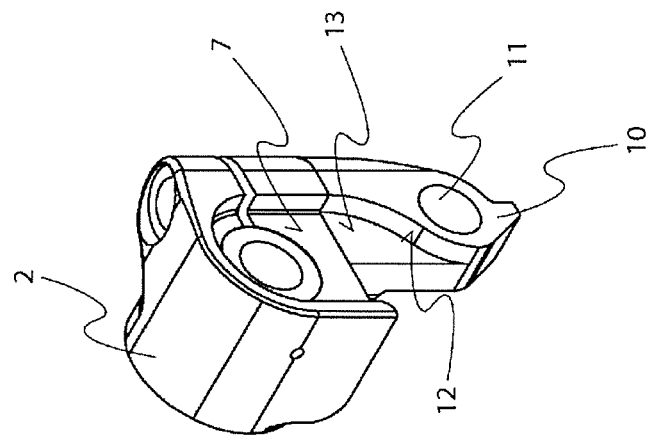
FIG. 2 shows a derailleur hanger of the present invention with an insertion aid according to one embodiment of the invention in the mounted state.
Figure 2:
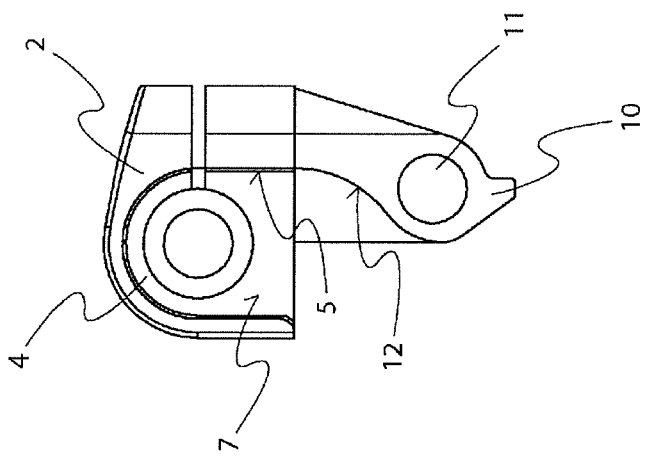

To facilitate the insertion of the wheel hub into the recesses 3, 4, a derailleur hanger 10 of the present invention, as shown in FIG. 2, has a guide surface 12 the shape of which substantially steadily continues into a lateral surface 5 of the recess 4 of the second dropout 2. The guide surface 12 limits the freedom of movement of the wheel hub in the plane of the area of the wheel to the effect that moving the end 32 of the hub 30 along the guide surface 12 automatically results in the end sliding into the recess 4.

The same is true for the second guide surface 13 provided on the derailleur hanger 10, which guide surface is a substantially steady continuation of the support surface 7 of the dropout 2. The second guide surface 13, however, limits the freedom of movement of the wheel hub along the wheel's axis, so that the wheel hub can be inserted into the recesses of the dropouts intended for this purpose, even against the sometimes substantial pull of the chain tensioning device of the derailleur.

Figure 3:
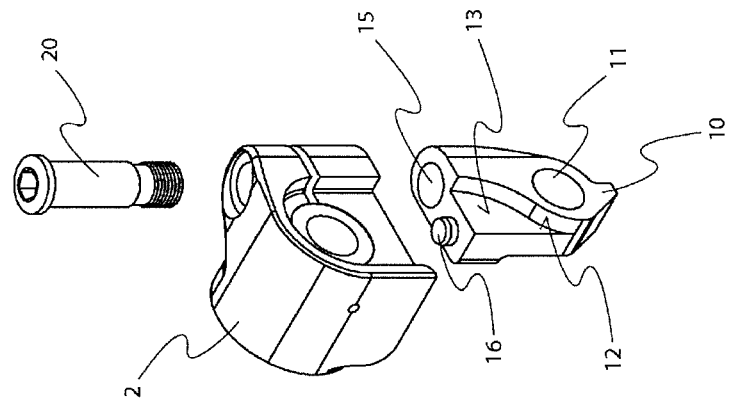
FIG. 3 shows a derailleur hanger of the present invention with an insertion aid according to one embodiment of the invention in the unmounted state.
Figure 3:
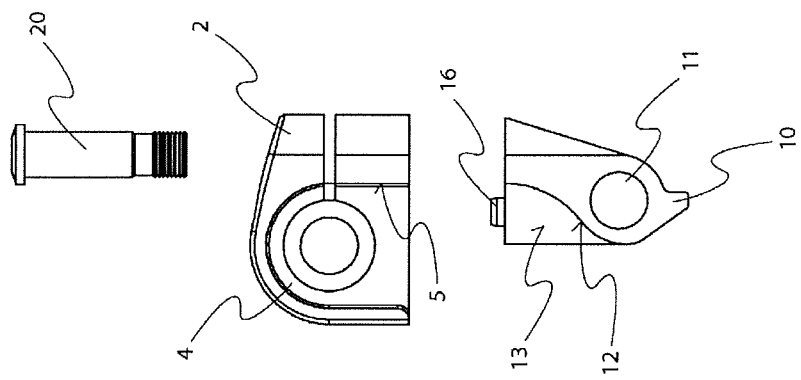

FIGS. 2 and 3 show the design of a derailleur hanger 10 of the present invention which is configured separate from the dropout 2, with the second fastening bolt 20 positioned substantially perpendicular to the central axis of the wheel hub.

At least a first hole 11 for receiving a first fastening bolt for a derailleur is provided on the derailleur hanger 10.

Further, the derailleur hanger 10 has a threaded hold 15 into which the second fastening bolt 20 is screwed.

In one example, the derailleur hanger is made of a material selected from a group comprising metals and metal alloys, particularly light metals, preferably aluminum and aluminum titanium alloys, and carbon fiber materials, plastics and particularly fiber-reinforced plastics, and composites of these materials and combinations thereof.

In the embodiment of FIG. 3, there is a pin 16 provided on the derailleur hanger 10, which pin engages with a corresponding hole on the dropout 2 and results in improved stability of the mechanical connection between the derailleur hanger 10 and the dropout 2 after insertion and tightening of the fastening bolt 20. In particular, the pin 16 serves to secure the derailleur hanger 10 against twisting relative to the dropout 2 when tightening the fastening bolt 20, ensuring in all cases that the first and second guide surfaces of the derailleur hanger continue substantially steadily into the lateral surface 5 and the support surface 7 of the recess 4.

The invention claimed is:

1. A device for aiding in the mounting of a wheel hub to a bicycle of the type including a through-axle, the device comprising:

at least one dropout adapted to be fixed to the bicycle and defining an aperture for receiving the through-axle and comprising a recess adapted to receive an end of the wheel hub when the wheel hub is mounted to the bicycle, the recess defined by a first lateral surface and a first support surface, and a derailleur hanger comprising a second lateral surface and a second support surface, wherein the first and second lateral surfaces together define a substantially continuous lateral guide surface and the first and second support surfaces together define a substantially continuous longitudinal guide surface that is generally perpendicular to the lateral guide surface, wherein during the mounting of the wheel hub, the lateral guide surface and the longitudinal guide surface are adapted to permit the wheel hub to be guided into alignment with the aperture with the lateral guide surface limiting movement of the wheel hub in a direction generally perpendicular to an axis of rotation defined by the wheel hub, and the longitudinal guide surface limiting the movement of the wheel hub in a direction along the axis of rotation defined by the wheel hub.

2. The device of claim 1, wherein the derailleur hanger defines at least a first hole for receiving a fastening bolt for a derailleur.

3. The device of claim 1, wherein the derailleur hanger is configured as a part separate from the at least one dropout and is releasably attached to the at least one dropout by at least one dropout fastening bolt.

4. The device of claim 3, wherein the at least one dropout fastening bolt extends in a direction substantially perpendicular to the axis of rotation defined by the wheel hub.

5. The device of claim 3, wherein the derailleur hanger defines a threaded hole into which the at least one dropout fastening bolt is threaded.

6. The device of claim 3 wherein the derailleur hanger further comprises a pin and the at least one dropout defines an alignment hole, wherein the pin engages with the alignment hole when the derailleur hanger is attached to the at least one dropout.

7. The device of claim 3, wherein the derailleur hanger further includes an anti-rotation element which prevents twisting of the derailleur hanger relative to the at least one dropout when the derailleur hanger is attached to the at least one dropout.

8. The device of claim 1, wherein the derailleur hanger is made of a material selected from the group consisting of metals, metal alloys, carbon fiber materials, plastics, fiber-reinforced plastics, composites of such materials, and combinations thereof.

* * * * *

UNITED STATES PATENT AND TRADEMARK OFFICE
CERTIFICATE OF CORRECTION

PATENT NO. : 8,491,427 B2  Page 1 of 1
APPLICATION NO. : 12/598907
DATED : July 23, 2013
INVENTOR(S) : Michael Grätz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 722 days.

Signed and Sealed this
Eighth Day of September, 2015

Michelle K. Lee
*Director of the United States Patent and Trademark Office*